(12) United States Patent
Niskala

(10) Patent No.: US 9,351,261 B2
(45) Date of Patent: May 24, 2016

(54) INTELLIGENT RADIO FREQUENCY POWER CONTROL

(75) Inventor: Kai Niskala, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 132 days.

(21) Appl. No.: 14/131,040

(22) PCT Filed: Jul. 18, 2011

(86) PCT No.: PCT/IB2011/053200
§ 371 (c)(1),
(2), (4) Date: Jan. 6, 2014

(87) PCT Pub. No.: WO2013/011352
PCT Pub. Date: Jan. 24, 2013

(65) Prior Publication Data
US 2014/0171141 A1    Jun. 19, 2014

(51) Int. Cl.
*H04B 1/38*        (2015.01)
*H04W 52/28*    (2009.01)
(Continued)

(52) U.S. Cl.
CPC .......... *H04W 52/28* (2013.01); *H04W 52/0209* (2013.01); *H04W 52/0248* (2013.01); *H04W 52/288* (2013.01); *H04W 52/367* (2013.01); *H04W 52/0245* (2013.01); *Y02B 60/50* (2013.01)

(58) Field of Classification Search
CPC ... H04B 1/3838; H04B 7/0613; H04B 7/0689
USPC ................ 455/574, 572, 550.1, 552.1, 553.1, 455/575.1, 422.1, 403, 57.11, 343.1–343.5, 455/445, 522, 69, 68, 73; 370/310, 311, 370/328, 329
See application file for complete search history.

(56) References Cited

U.S. PATENT DOCUMENTS 7,146,139 B2    12/2006    Nevermann
7,330,705 B2    2/2008    Lee
(Continued)

FOREIGN PATENT DOCUMENTS

EP    1298809 A2    4/2003
EP    2293457 A2    3/2011
(Continued)

OTHER PUBLICATIONS

Extended European Search Report received for corresponding European Patent Application No. 11869670.7, dated Jan. 29, 2015, 6 pages.
(Continued)

*Primary Examiner* — Keith Ferguson
(74) *Attorney, Agent, or Firm* — Squire Patton Boggs (US) LLP

(57) ABSTRACT

Cognitive radio may benefit from cognitive transmission power control. Cognitive power control may relate to minimizing current consumption and placing limitations on electromagnetic fields (EMF) and specific absorption rate (SAR) especially for transmission during body-worn use. A method can include calculating and forecasting power consumption and exposure due to transmission by a device to a user of the device to obtain a calculated power consumption and exposure. The method can also include comparing the calculated and the forecasted exposure to at least one predetermined criterion to obtain a compliance result. The method can further include adjusting at least one parameter of the device contingent upon the compliance result. The calculating and the forecasting can be performed in real time.

18 Claims, 3 Drawing Sheets

(51) Int. Cl.
*H04W 52/36* (2009.01)
*H04W 52/02* (2009.01)

(56) References Cited

U.S. PATENT DOCUMENTS

| | | |
|---|---|---|
| 7,499,722 B2 | 3/2009 | McDowell et al. |
| 2002/0016155 A1 | 2/2002 | Charbonnier |
| 2005/0075123 A1 | 4/2005 | Jin et al. |
| 2005/0124305 A1 | 6/2005 | Stichelbout |
| 2009/0013204 A1 | 1/2009 | Kobayashi et al. |
| 2009/0047998 A1 | 2/2009 | Alberth, Jr. |
| 2009/0305742 A1 | 12/2009 | Caballero et al. |
| 2010/0120466 A1* | 5/2010 | Li ............................. 455/552.1 |
| 2010/0203862 A1 | 8/2010 | Friedlander et al. |
| 2010/0233989 A1 | 9/2010 | Constien et al. |
| 2010/0279751 A1 | 11/2010 | Pourseyed et al. |
| 2010/0291963 A1* | 11/2010 | Patel et al. .................... 455/522 |
| 2010/0317302 A1 | 12/2010 | Greenwood et al. |
| 2011/0133729 A1 | 6/2011 | Vernickel et al. |
| 2011/0237289 A1 | 9/2011 | Fodor et al. |
| 2011/0309940 A1* | 12/2011 | Hyde ...................... G08B 3/10 340/600 |
| 2011/0319123 A1* | 12/2011 | Kwun et al. .................. 455/522 |

FOREIGN PATENT DOCUMENTS

| | | |
|---|---|---|
| WO | 03/105494 A2 | 12/2003 |
| WO | 2008067189 | 6/2008 |
| WO | 2010/144620 A1 | 12/2010 |

OTHER PUBLICATIONS

Faraone et al., "Method of Ensuring SAR Compliance for Multi-Mode and MIMO Handheld Wireless Communication Devices While Optimizing Link-Margin", URSI Proceedings, 2008, 4 pages.

Kanda et al., "Measurement of Localized Specific Absorption Rate (SAR) for Contactless Smartcard Readers Operating in the HF Band", IEEE Transactions on Electromagnetic Compatibility, vol. 40, Issue No. 4, Nov. 1998, pp. 370-376.

International Search Report received for corresponding Patent Cooperation Treaty Application No. PCT/IB2011/053200, dated Apr. 2, 2012, 5 pages.

* cited by examiner

INTELLIGENT RADIO FREQUENCY POWER CONTROL

RELATED APPLICATION

This application was originally filed as PCT Application No. PCT/IB2011/053200 filed Jul. 18, 2011.

BACKGROUND

1. Field

Cognitive radio may benefit from cognitive transmission power control. Cognitive power control may relate to minimizing current consumption and placing limitations on electromagnetic fields (EMF) and specific absorption rate (SAR) especially for transmission during body-worn use.

2. Description of the Related Art

Current specific absorption test standards assume a worst case scenario, for example, maximum transmission (Tx) power in test set-up, even if the exposure guidelines consider limits as averaged over a one-minute or six-minute interval. In real life, in a body-worn situation, transmission may seldom be ON and may be ON for only limited periods of time. Meanwhile, operator over-the-air (OTA) requirements have been getting more and more demanding.

Current power/specific absorption rate reduction techniques simply limit transmission at maximum power when device is operated body-worn. This can cause lost connections and other limitations in over-the-air performance.

SUMMARY

In certain embodiments a method includes calculating and forecasting exposure due to transmission by a device to a user of the device to obtain a calculated exposure. The method also includes comparing the calculated and forecasted exposure to at least one predetermined criterion to obtain a compliance result. The method further includes adjusting at least one parameter of the device contingent upon the compliance result. The calculating and forecasting is performed in real time.

An apparatus, according to certain embodiments, includes at least one processor and at least one memory including computer program code. The at least one memory and computer program code are configured to, with the at least one processor, cause the apparatus at least to calculate and forecast exposure due to transmission by a device to a user of the device to obtain a calculated exposure. The at least one memory and computer program code are also configured to, with the at least one processor, cause the apparatus at least to compare the calculated and forecasted exposure to at least one predetermined criterion to obtain a compliance result. The at least one memory and computer program code are further configured to, with the at least one processor, cause the apparatus at least to adjust at least one parameter of the device contingent upon the compliance result. The apparatus is configured to calculate and forecast the exposure in real time.

According to certain embodiments, an apparatus includes calculating means for calculating and forecasting exposure due to transmission by a device to a user of the device to obtain a calculated exposure. The apparatus also includes comparing means for comparing the calculated and forecasted exposure to at least one predetermined criterion to obtain a compliance result. The apparatus further includes adjusting means for adjusting at least one parameter of the device contingent upon the compliance result. The calculating and forecasting is performed in real time.

A computer readable medium, according to certain embodiments is encoded with instructions that, when executed in hardware, perform a process. The process includes calculating and forecasting exposure due to transmission by a device to a user of the device to obtain a calculated exposure. The process also includes comparing the calculated and forecasted exposure to at least one predetermined criterion to obtain a compliance result. The process further includes adjusting at least one parameter of the device contingent upon the compliance result. The calculating and forecasting is performed in real time.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
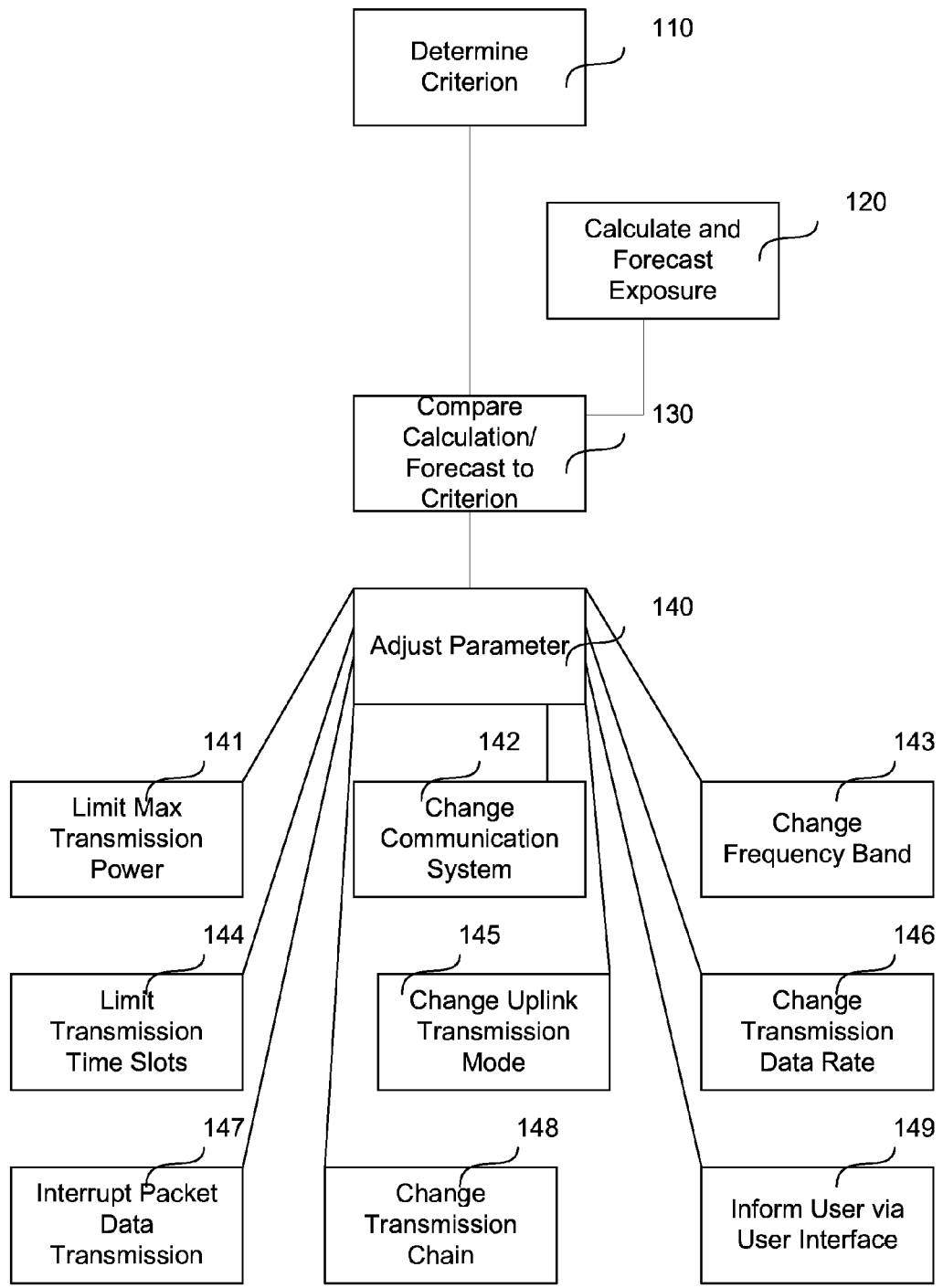
FIG. 1 illustrates a method according to certain embodiments of the present invention.

Cognitive radio may benefit from cognitive transmission power control. Cognitive radio can both seek for available spectrum and the like, but—using cognitive transmission power control can also take power consumption and radio frequency (RF) exposure conditions into account.

Different exposure limits may be applicable in different countries using the same technology or frequency band. Having hardware and/or software variants for each market is one approach to address these different exposure limits. However, this may limit the international use of the device. As an alternative, recognition of applicable exposure limits can be done via power alteration that depends on country in which the device is used.

Certain embodiments of the present invention can address the competing interests of exposure to electromagnetic fields and maintaining connectivity and other over-the-air performance criteria, while managing power usage. Certain embodiments of the present invention calculate real-time, real-use case exposure. Moreover, certain embodiments can ensure that exposure limits are not exceeded. At the same time, radio network capacity can be enhanced.

Upon recognizing the country in which the device is being used, the device can adjust for applicable exposure limits and/or specific absorption rate testing requirements.

In addition, or in alternative, exposure limits can be set by a user. Thus, for example, if a user wishes to change a recommended exposure limit, the user can be permitted to set the exposure limit different than a recommended limit. For example, if the user wishes to impose a power saving scheme (for example, low, mid, or high power saving) or a stricter exposure limit, the user can be permitted to decrease the radio frequency power limit. For another example, a user can set a limit in another dimension from a system-imposed limitation (for example, peak radio frequency power and cumulative radio frequency power are two different dimensions with respect to which limitations can be set). In certain embodiments, when an emergency service call (such as a call to 911) is detected, maximum radio frequency power can be made available, even if this conflicts with user-set limits.

The power control system can take into account location and local exposure regulations and/or different specific absorption rate testing requirements. The location of the device can be determined in various ways. For example, global positioning system (GPS), mobile country codes, or communication frequency band can be used to determine the location of the device. The device can have stored information regarding the requirements of various countries or locations.

The device can also take into account exposure conditions. For example, if the device is being used against the head, being body-worn, or is being held or placed at a given distance to a user. In a more specific example, the device may determine whether any wired or wireless peripherals, such as a BlueTooth® headset or wired ear buds, are being used. The exposure in some uses may differ from the exposure in other uses. Additionally, the device may be designed to coordinate with other nearby devices, whether or not they are peripheral to the device. Thus, an overall exposure can be cooperatively determined and controlled.

The device can further take into account usage mode. For example, usage modes can include talk, data, connected peripherals, and wireless router mode. Depending on the mode, the device can calculate the exposure due to various operations at various signal strengths, as well as exposure at various areas of the spectrum. In short, the signal characteristics associated with various usage modes may differ from one another and can be taken into account in limiting the power of the device.

The device can additionally take into account position with respect to a human body, such as, proximity of human head, body or extremities. The human body can be the body of the user of the device. The extremity can be the human hand.

The device can also take into account position and orientation of device. For example, the device can use a G-sensors, motion detection, gyroscope or the like. Optionally, an external device such as a camera can be used to determine the orientation of the device.

The device can further take into account certified specific absorption rate (SAR) level of the device in different exposure conditions. Thus, for example, the device can take into account its own certifications and can operate within them.

The device can additionally take into consideration radio link conditions and forecasts. For example, to reduce a total amount of exposure, power levels can be reduced when radio link quality is good, or is expected to be good. Likewise, when radio link quality is forecast to be bad, power levels can be increased. More particularly, past, current and forecasted power level and duration of transmissions can be taken into account. Thus, for example, if the device forecasts lengthy or high-power communications, some communications may be more power-limited than they otherwise would be.

The device can also take into account integration of power level and specific absorption rate over specified temporal intervals. In other words, the device can take into account the cumulative effect of power level and specific absorption rate, rather than only considering the matter on an instantaneous basis.

The device can calculate and forecast running average specific absorption rate of a transmission. Based on this exposure analysis, the device can change the uplink properties or other device parameters. For example, the device can change the parameters when excessive power could happen or when exposure guidelines could be exceeded.

The affected properties or parameters can include, but are not limited to the following:

limit maximum transmit power (including transmissions both in a primary band and in secondary bands);
change to communication system having lower power consumption or lower exposure potential (for example, a handover from a system that operates at longer range to a system that operates at shorter range, or from a system that operates in one band, to a system that operates in another band, or from Global System for Mobile Communications (GMS) or Universal Mobile Telecommunication System (UMTS) or Long Term Evolution (LTE) or WiMAX to Wireless Local Area Network (WLAN) or other low power wireless communication system);
change communications system frequency band (for example, during a handover, as in the previous item, or within a single communication system that permits operation in multiple bands, for example, GSM 1900 MHz to GSM 850 MHz);
limit number of transmission time-slots or change uplink transmission mode;
change transmission data rate;
interrupt packet data transmission for a needed interval;
change transmission chain (for example, use a different antenna or a reduced number of antennas); or
inform user and/or make suggestion via user interface (UI) (for example, the system can provide a display, sound, vibration, or the like).

Of course, more than one of the above parameters can be affected in combination with one another.

This calculation and control loop can be performed real-time based on running integrated and forecasted power consumption and user exposure. Thus, the device can be cognitive of the device's own exposure characteristics and can act accordingly with respect to exposure limits.

All available data can be combined into a decision tree. Then the device can calculate and forecast time-averaged specific absorption rate in real-time. The radio frequency (RF) exposure rate can be adjusted according to local regulations and limits, using the same hardware and software everywhere.

Thus, certain embodiments of the present invention may provide more room between stringent exposure standards and over-the-air (OTA) performance requirements. Thus, certain embodiments may avoid or reduce dropped calls due to power or total radiated power (TRP) limitations. Certain embodiments, therefore, may permit more attractive form factors and designs of devices. In some cases, network operators may indirectly benefit from embodiments by having fewer dropped calls, because the devices may be permitted to use more smooth power variation than in some alternative configurations. Additionally, the use of dynamic control in certain embodiments may permit customization of the devices for different markets with different exposure regulation.

FIG. 1 illustrates a method according to certain embodiments of the present invention. The method shown in FIG. 1 can be performed by hardware using software or by hardware alone. A device such as a mobile phone, personal digital assistant, portable terminal or other user equipment can perform the method.

As shown in FIG. 1, the method can include, at 120, calculating and forecasting power usage and/or exposure due to transmission by a device to a user of the device to obtain a calculated exposure. The calculating can be performed in real time. The forecasting can be, for example, a prediction of power usage or exposure due to the uploading of a large file, streaming of video or audio of a known or estimated length, or a prediction of power usage or exposure due to a telephone or video call of a typical length.

The calculating and forecasting can be based on usage mode or based on a position of the device with respect to the user's body. For example, the calculating and forecasting can take into account whether the device is near a user's head, chest, hip, hand, and so forth. The calculating and forecasting can be based on an orientation of the device. Orientation and position can be used in combination.

The calculating and forecasting can be based on a certification of the device, such a manufacturer's certification of a certification of a wireless service provider. The calculating and forecasting can also be based on radio link conditions and/or radio access technology. Current and forecast conditions (or either of them) can be taken into account. The current conditions can be the instantaneous conditions or the conditions up to a given point in time. Thus, the calculating can be based on integration of at least one of power level or specific absorption rate. The forecasting can forecast a running average power consumption or specific absorption rate of the transmission. The forecasting can also take into account a difference in power usage or exposure rate due to alternative radio access technologies where a transmission is able to be supported by multiple radio access technologies. For example, systems such as Long Term Evolution (LTE) and Worldwide Interoperability for Microwave Access (WiMAX) may have different bandwidths, frequency bands, and modulations that can be taken into account when forecasting various alternatives. Likewise, the forecasting can consider the option of using multiple simultaneous transmission, and can make a prediction based on such a scenario.

The method can also include, at 130, comparing the calculated and forecasted exposure to at least one predetermined criterion to obtain a compliance result. The calculated and forecasted exposure can refer to the calculations described above.

The method can further include, at 140, adjusting at least one parameter of the device contingent upon the compliance result and/or in order to save or conserve power for the device. The adjusting can include, at 141, limiting maximum transmission power. The adjusting can also include, at 142, changing to a communication system having lower power consumption or exposure potential. The adjusting can further include, at 143, changing communications system frequency band or changing radio access technology.

The adjusting can include, at 144, limiting a number of transmission time-slot. At 145, the adjusting can include changing uplink transmission mode. The modulation and coding scheme, transmission power level, or other uplink transmission parameters can be adjusted. The adjusting can include, at 146, changing transmission data rate. At 147, the adjusting can include interrupting packet data transmission for a needed interval. The adjusting can include changing transmission chain at 148. For example, a particular antenna or particular group of antennas can be selected. The adjusting can also include, at 149, communicating with the user via a user interface.

The method can additionally include, at 110, determining the predetermined criterion based on at least one of geographic location, usage mode, or user indication. For example, the geographic location can be country, state, or region. The usage mode can be text, voice, video, Internet, or the like. The usage mode can alternatively refer to whether a wireless phone network or a wireless local area network is being used. The user indication can be a setting set by a user.

Figure 2:
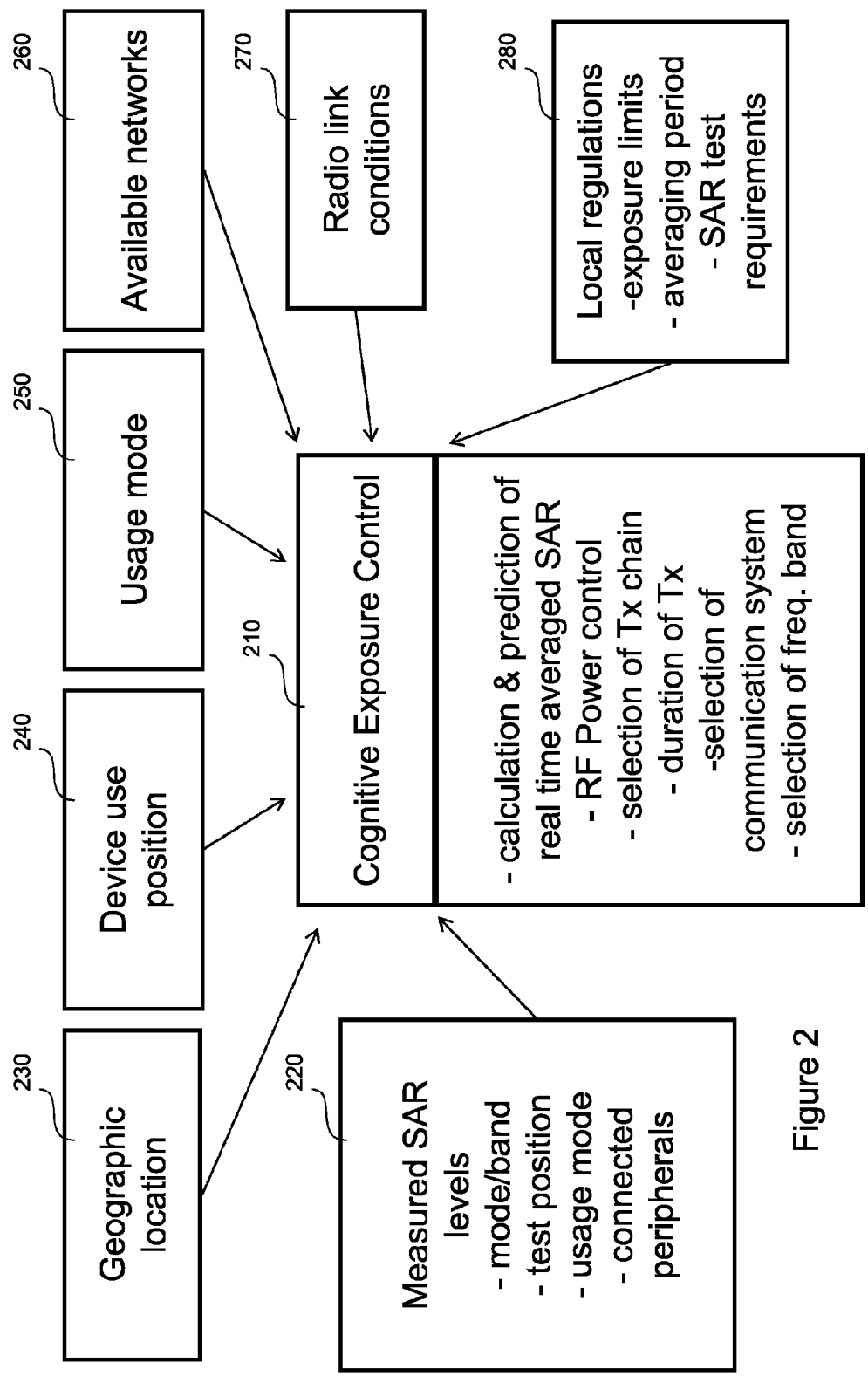
FIG. 2 illustrates a system according to certain embodiments of the present invention.

FIG. 2 illustrates a system according to certain embodiments of the present invention. As shown in FIG. 2, a variety of modules can be used by a device to control power consumption and exposure. For example a measure specific absorption rate (SAR) levels module 220 can provide an input to a cognitive exposure control module 210, which may be a controller. The measured SAR levels module 220 can provide information such as mode and band, test position, usage mode, and connected peripherals.

A geographic location module 230 can provide information on geographic location. This module may be, for example, a global positioning system (GPS) module. A device use position module 240 may provide information regarding the position of a device in use. This module may be, for example, a piezoelectric or gyroscopic sensor. A usage mode module 250 can provide information regarding a mode of use, such as third generation (3G) or wireless local area network (WLAN). The usage module 250 can also provide information regarding multiple simultaneous transmissions, such as primary cellular transmission in conjunction with a WLAN or Bluetooth® transmission. An available networks module 260 can provide information regarding networks that are available—both networks currently in use, and alternative networks to which the device can connect.

A radio link conditions module 270 can inform the cognitive exposure module 210 about the current (or historical or forecasted) radio link conditions that the device is experiencing (or has or will experience). A local regulations module 280 can provide information such as exposure limits, averaging period, and SAR test requirements.

The cognitive exposure control module 210 can receive the various information inputs described above, as well as additional information inputs such as inputs from a user interface or from a memory of the device, and can perform calculations and make comparisons. Based on the calculations and comparisons, the cognitive exposure control module 210 can perform (or cause the device to perform) various functions.

The functions that can be performed can include calculation and prediction of real-time averaged power consumption and SAR. The functions can also include radio frequency (RF) power control and selection of a transmission (Tx) chain. The duration of transmission can also be controlled by the cognitive exposure module 210, as can the selection of a communication system or frequency band.

Figure 3:
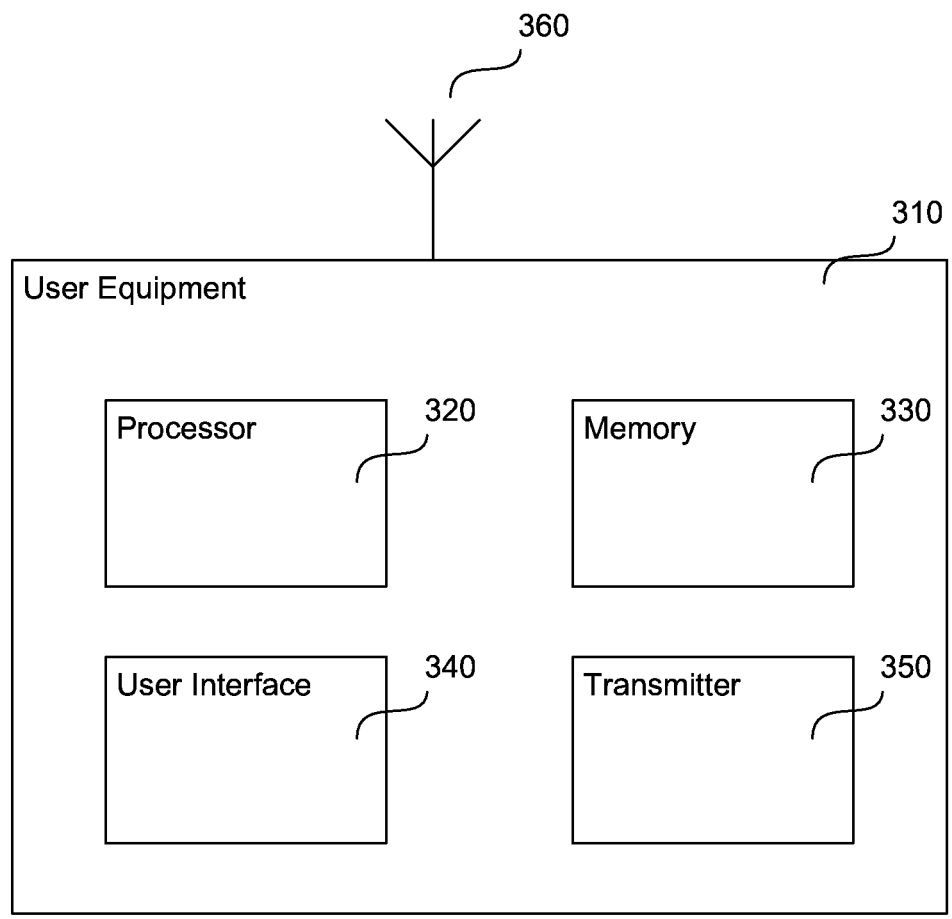
FIG. 3 illustrates an apparatus according to certain embodiments of the present invention.

FIG. 3 illustrates an apparatus according to certain embodiments of the present invention. As shown in FIG. 3, an apparatus can be a user equipment 310, which can be a hardware device. Here user equipment 310 is taken as a general example terminal devices that can be operated by users or be carried by users. For example, a user equipment 310 can be a mobile phone, a personal digital assistant, a laptop computer, an e-book reader, an entertainment console or controller, or a tablet computer. The user equipment 310 can include at least one processor 320 and at least one memory 330 including computer program instructions.

The user equipment 310 may also include a user interface 340, which can be, for example, a display, a vibrating device, or a speaker (or any combination thereof). The user interface 340 may also include a proximity sensor for hands. The user equipment 310 may also include one or more transmitter 350 configured to operate in conjunction with one or more antenna 360 to communicate wirelessly. The user equipment 310 can be configured to change a transmission chain by switching between antennas or by transmitting from a different set (such as a subset) of antennas. The user equipment 310 may be optimized to support multiple transmitters and multiple wireless standards. For example, user equipment 310 may support simultaneous transmission of a cellular (for example, GSM/UMTS/LTE) and non-cellular (for example, WLAN/Bluetooth®).

The at least one processor 320 can be variously embodied by any computational or data processing device, such as a central processing unit (CPU) or application specific integrated circuit (ASIC). The at least one processor 320 can be implemented as one or a plurality of controllers.

The at least one memory 330 can be any suitable storage device, such as a non-transitory computer-readable medium. For example, a hard disk drive (HDD) or random access memory (RAM) can be used in the at least one memory 330. The at least one memory 330 can be on a same chip as the at least one processor 320, or may be separate from the at least one processor 320.

The computer program instructions may be any suitable form of computer program code. For example, the computer program instructions may be a compiled or interpreted computer program.

The at least one memory 330 and computer program instructions can be configured to, with the at least one processor 320, cause a hardware apparatus (for example, user equipment 310) to perform a process, such as the process shown in FIG. 1 or any other process described herein.

For example, the at least one memory 330 and computer program instructions can be configured to, with the at least one processor 320, cause the apparatus at least to calculate and forecast exposure due to transmission by a device to a user of the device to obtain a calculated exposure, compare the calculated and forecasted exposure to at least one predetermined criterion to obtain a compliance result, and adjust at least one parameter of the device contingent upon the compliance result. The apparatus can be configured to calculate and forecast the exposure in real time.

The at least one memory 330 and computer program instructions can be configured to, with the at least one processor 320, cause the apparatus at least to determine the predetermined criterion based on at least one of geographic location, usage mode, or user indication. The at least one memory 330 and computer program instructions can also be configured to, with the at least one processor 320, cause the apparatus at least to calculate and forecast the exposure based on usage mode. The at least one memory 330 and computer program instructions can further be configured to, with the at least one processor 320, cause the apparatus at least to calculate and forecast the exposure based on a position of the device with respect to the user's body.

The at least one memory 330 and computer program instructions can be configured to, with the at least one processor 320, cause the apparatus at least to calculate and forecast the exposure based on an orientation of the device. The at least one memory 330 and computer program instructions can also be configured to, with the at least one processor 320, cause the apparatus at least to calculate and forecast the exposure based on a certification of the device. The at least one memory 330 and computer program instructions can further be configured to, with the at least one processor 320, cause the apparatus at least to calculate and forecast the exposure based on radio link conditions.

The at least one memory 330 and computer program instructions can be configured to, with the at least one processor 320, cause the apparatus at least to calculate and forecast the power consumption and exposure based on integration of at least one of power level or specific absorption rate. The at least one memory 330 and computer program instructions can also be configured to, with the at least one processor 320, cause the apparatus at least to forecast a running average specific absorption rate of the transmission. The at least one memory 330 and computer program instructions can further be configured to, with the at least one processor 320, cause the apparatus at least to adjust the parameter by limiting maximum transmission power.

The at least one memory 330 and computer program instructions can be configured to, with the at least one processor 320, cause the apparatus at least to adjust the parameter by changing to a communication system having lower power consumption or exposure potential. The at least one memory 330 and computer program instructions can also be configured to, with the at least one processor 320, cause the apparatus at least to adjust the parameter by changing communications system frequency band. The at least one memory 330 and computer program instructions can further be configured to, with the at least one processor 320, cause the apparatus at least to adjust the parameter by limiting a number of transmission time-slots.

The at least one memory 330 and computer program instructions can be configured to, with the at least one processor 320, cause the apparatus at least to adjust the parameter by changing uplink transmission mode. The at least one memory 330 and computer program instructions can also be configured to, with the at least one processor 320, cause the apparatus at least to adjust the parameter by changing transmission data rate. The at least one memory 330 and computer program instructions can further be configured to, with the at least one processor 320, cause the apparatus at least to adjust the parameter by interrupting packet data transmission for a needed or a specific time interval.

The at least one memory 330 and computer program instructions can be configured to, with the at least one processor 320, cause the apparatus at least to adjust the parameter by changing transmission chain. For example, the apparatus can adjust the parameter by selecting a different antenna or a different set of antennas, by adjusting a position of an antenna, or by steering a beam of the antenna(s) so to provide a different path. Alternatively, the apparatus can adjust be parameter by selecting a different radio frequency system, for example, Wideband Code Division Multiple Access (WCDMA) or WLAN instead of GSM. The at least one memory 330 and computer program instructions can also be configured to, with the at least one processor 320, cause the apparatus at least to adjust the parameter by communicating with the user via a user interface.

Thus, in certain embodiments, a non-transitory computer-readable medium can be encoded with computer instructions that, when executed in hardware perform a process, such as one of the processes described above. Alternatively, certain embodiments of the present invention may be performed entirely in hardware.

Although embodiments of the invention have been discussed above in terms of a portable user equipment, terminal device, or the like, the invention may also be employed by other device. For example, a base station, a relay station, a router, or a hotspot may be configured in accordance with certain embodiments of the present invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method, comprising:
   forecasting, by a device, a specific absorption rate for a user of the device due to transmission by the device to obtain a forecasted specific absorption rate;
   comparing, by the device, the forecasted specific absorption rate to at least one predetermined criterion to obtain a compliance result; and
   adjusting, by the device, at least one parameter of the device contingent upon the compliance result,
   wherein the forecasting is performed in real time.

2. The method of claim 1, further comprising:
   adjusting at least one parameter of the device to conserve power based on the forecasting.

3. The method of claim 1, further comprising:
   determining the predetermined criterion based on at least one of geographic location, usage mode, or user indication.

4. The method of claim 1, further comprising:
   forecasting the specific absorption rate based on at least one of usage mode, a certification of the device, radio link conditions, an orientation of the device, or a position of the device with respect to the user's body.

5. The method of claim 1, further comprising:
   forecasting a running average specific absorption rate of the transmission.

6. The method of claim 1, wherein the adjusting the parameter comprises changing to a communication system having lower power consumption or specific absorption rate potential.

7. The method of claim 1, wherein the adjusting the parameter comprises at least one of limiting maximum transmission power, changing communications system frequency band, changing radio access technology, changing uplink transmission mode, changing transmission data rate, changing transmission chain, limiting a number of transmission time-slots, interrupting packet data transmission for a needed interval or communicating with the user via a user interface.

8. An apparatus, comprising:
   at least one processor; and
   at least one memory including computer program code,
   wherein the at least one memory and computer program code are configured to, with the at least one processor, cause the apparatus at least to
   forecast specific absorption rate for a user of the apparatus due to transmission by the apparatus to obtain a forecasted specific absorption rate;
   compare the forecasted specific absorption rate to at least one predetermined criterion to obtain a compliance result;
   adjust at least one parameter of the apparatus contingent upon the compliance result; and
   forecast in real time.

9. The apparatus of claim 8, wherein the at least one memory and computer program code are configured to, with the at least one processor, cause the apparatus at least to adjust at least one parameter of the apparatus to conserve power based on the forecasting.

10. The apparatus of claim 8, wherein the at least one memory and computer program code are configured to, with the at least one processor, cause the apparatus at least to forecast the specific absorption rate due to the transmission wherein the transmission by the apparatus comprises multiple simultaneous transmissions.

11. The apparatus of claim 10, wherein the at least one memory and computer program code are configured to, with the at least one processor, cause the apparatus at least to forecast the specific absorption rate due to the multiple simultaneous transmissions, wherein the multiple simultaneous transmissions comprise at least one cellular transmission and at least one non-cellular transmission.

12. The apparatus of claim 8, wherein the at least one memory and computer program code are configured to, with the at least one processor, cause the apparatus at least to determine the predetermined criterion based on at least one of geographic location, usage mode, or user indication.

13. The apparatus of claim 8, wherein the at least one memory and computer program code are configured to, with the at least one processor, cause the apparatus at least to forecast the specific absorption rate based on at least one of usage mode, a certification of the apparatus, radio link conditions, an orientation of the apparatus, or a position of the apparatus with respect to the user's body.

14. The apparatus of claim 8, wherein the at least one memory and computer program code are configured to, with the at least one processor, cause the apparatus at least to forecast a running average specific absorption rate of the transmission.

15. The apparatus of claim 8, wherein the at least one memory and computer program code are configured to, with the at least one processor, cause the apparatus at least to adjust the parameter by changing to a communication system having lower power consumption or specific absorption rate potential.

16. The apparatus of claim 8, wherein the at least one memory and computer program code are configured to, with the at least one processor, cause the apparatus at least to adjust the parameter by at least one of limiting maximum transmission power, changing communications system frequency band, changing radio access technology, changing uplink transmission mode, changing transmission data rate, changing transmission chain, limiting a number of transmission time-slots, interrupting packet data transmission for a needed interval or communicating with the user via a user interface.

17. The apparatus of claim 8 is a mobile phone, a personal digital assistant, a laptop computer, an e-book reader, an entertainment console or controller, or a tablet computer.

18. A computer program, embodied on a non-transitory computer readable medium, the computer program, when executed by a processor, causes the processor to:
   forecast, by a device, a specific absorption rate for a user of the device due to transmission by the device to obtain a forecasted specific absorption rate;
   compare, by the device, the forecasted specific absorption rate to at least one predetermined criterion to obtain a compliance result; and
   adjust, by the device, at least one parameter of the device contingent upon the compliance result,
   wherein the forecast is performed in real time.

* * * * *